United States Patent
Kim

(10) Patent No.: US 11,325,640 B2
(45) Date of Patent: May 10, 2022

(54) APPARATUS AND METHOD FOR CONTROLLING MOTOR DRIVEN POWER STEERING

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 14 days.

(21) Appl. No.: 17/084,110

(22) Filed: Oct. 29, 2020

(65) Prior Publication Data
US 2021/0197890 A1    Jul. 1, 2021

(30) Foreign Application Priority Data

Dec. 31, 2019  (KR) .......................... 10-2019-0178847

(51) Int. Cl.
| | |
|---|---|
| *B62D 5/04* | (2006.01) |
| *B62D 6/00* | (2006.01) |
| *B62D 15/02* | (2006.01) |
| *B60W 50/00* | (2006.01) |

(52) U.S. Cl.
CPC ........... *B62D 5/0484* (2013.01); *B62D 5/046* (2013.01); *B62D 6/00* (2013.01); *B62D 15/0235* (2013.01); *B60W 2050/0073* (2013.01)

(58) Field of Classification Search
CPC ............ B62D 1/286; B60W 2050/007; B60W 2050/0073
See application file for complete search history.

(56) References Cited

U.S. PATENT DOCUMENTS

| | | | | |
|---|---|---|---|---|
| 9,387,877 | B2* | 7/2016 | Tsubaki | B62D 5/0463 |
| 10,583,857 | B2* | 3/2020 | Tsubaki | B62D 5/0463 |
| 2016/0039428 | A1* | 2/2016 | Odate | B60W 50/082 |
| | | | | 701/23 |
| 2016/0207538 | A1* | 7/2016 | Urano | G05D 1/0061 |
| 2017/0183028 | A1* | 6/2017 | Kitazume | B62D 5/0466 |
| 2017/0203788 | A1* | 7/2017 | Heo | B62D 15/025 |
| 2017/0297614 | A1* | 10/2017 | Minaki | B62D 1/28 |

(Continued)

FOREIGN PATENT DOCUMENTS

| | | |
|---|---|---|
| JP | 2017206252 | 11/2017 |
| JP | 6380721 | 8/2018 |
| KR | 101779823 | 10/2017 |

*Primary Examiner* — Thomas G Black
*Assistant Examiner* — Sara J Lewandroski
(74) *Attorney, Agent, or Firm* — H.C. Park & Associates, PLC

(57) ABSTRACT

An apparatus for controlling an motor-driven power steering (MDPS) may include: a driving information input unit configured to receive driving information; a steering angle position control unit configured to receive a command steering angle and a current motor steering angle of a driving motor, and output an autonomous driving command; and an MDPS control unit configured to drive the driving motor based on the autonomous driving command in an autonomous driving mode, determine whether a driver intervenes in steering, calculate a driver command by the driver's steering according to whether the driver intervenes in steering, and change an operation mode from the autonomous driving mode to a driver mode while driving the driving motor with a compensation output between the driver command and the autonomous driving command.

19 Claims, 7 Drawing Sheets

(56) References Cited

U.S. PATENT DOCUMENTS

| | | | | |
|---|---|---|---|---|
| 2018/0015947 A1* | 1/2018 | Akatsuka | | B62D 5/0463 |
| 2018/0057009 A1* | 3/2018 | Maeda | | B60W 30/12 |
| 2018/0065657 A1* | 3/2018 | Hirate | | B62D 5/0481 |
| 2018/0201317 A1* | 7/2018 | Kudo | | B62D 15/0255 |
| 2018/0304918 A1* | 10/2018 | Kunihiro | | B62D 5/0463 |
| 2018/0304920 A1* | 10/2018 | Hirate | | B62D 6/003 |
| 2019/0039647 A1* | 2/2019 | Tsubaki | | B62D 15/025 |
| 2019/0193776 A1* | 6/2019 | Tsubaki | | B62D 6/04 |
| 2019/0225260 A1* | 7/2019 | Tsubaki | | B62D 15/0235 |
| 2019/0300013 A1* | 10/2019 | Shiraishi | | B60W 60/0053 |
| 2019/0300044 A1* | 10/2019 | Tsubaki | | B62D 6/007 |
| 2019/0359251 A1* | 11/2019 | Shimokawabe | | B62D 5/0466 |
| 2020/0290668 A1* | 9/2020 | Moreillon | | B62D 15/025 |
| 2021/0245796 A1* | 8/2021 | Aoki | | B62D 15/025 |
| 2021/0380144 A1* | 12/2021 | Miki | | B60W 50/082 |

\* cited by examiner

APPARATUS AND METHOD FOR CONTROLLING MOTOR DRIVEN POWER STEERING

CROSS-REFERENCE TO RELATED APPLICATION

This application claims priority from and the benefit of Korean Patent Application No. 10-2019-0178847, filed on Dec. 31, 2019, which is hereby incorporated by reference for all purposes as if set forth herein.

BACKGROUND

Field

Exemplary embodiments of the present disclosure relate to an apparatus and method for controlling an MDPS (Motor-Driven Power Steering), and more particularly, to an apparatus and method for controlling an MDPS, which can determine steering intervention by not only adjusting a reference torque map for determining steering intervention by reflecting a command steering angle by autonomous driving, but also adjusting a variable count according to the magnitude the column torque, such that a autonomous vehicle transitions from an autonomous driving mode to a driver mode, and adjust transition speed by adjusting a blending period of the autonomous driving mode and the driver mode based on the column torque at the time point that it is determined that a driver has intervened in steering, such that the mode transition can be rapidly performed in case of sudden steering.

Discussion of the Background

Recently, with the development of automotive technology, it is expected that autonomous vehicles which can autonomously drive without a driver's operation will be rapidly spread. Such an autonomous vehicle refers to a vehicle which can autonomously drive by controlling various sensors and control systems through AI (Artificial Intelligence).

The autonomous vehicle has advantages in that it can not only prevent a driver's aggressive driving or an accident caused by a driver's careless mistake, but also be freely used even by an unlicensed driver, a blind person or a minor. In particular, much research is conducted on the stability of the autonomous vehicle. For example, much research is being conducted on the technology for stably switching a driving control authority to a driver when the vehicle switches (transitions) from an autonomous driving mode to a manual mode in which the driver operates the vehicle in person.

However, much research needs to be conducted on a technique for enabling a user to maintain a sense of stability while an autonomous vehicle is operated in the autonomous driving mode. When the sense of stability is reduced, the user may have anxiety or distrust about autonomous driving.

For example, as the driving speed of an autonomous vehicle is changed while the autonomous vehicle travels in the autonomous driving mode (for example, the driving speed is changed from low speed to high speed or from high speed to low speed), the user may have a sense of difference when an operation mode (or MDPS control mode) for controlling an MDPS transitions.

When the driving speed of the vehicle is changed from low speed to high speed or from high speed to low speed, the operation mode for controlling the MDPS is also changed from a position control mode to a torque control mode or from the torque control mode to the position control mode. During an intermediate process in which the operation mode for controlling the MDPS is changed, an output difference occurs.

When an output difference occurs during the intermediate process in which the operation mode for controlling the MDPS is changed, a passenger may have a sense of insecurity. In other word, the sense of stability may be reduced.

In order to solve such a problem, there is a need for a method which can prevent an undesired mode transition by more accurately detecting a driver's steering intervention, and smoothly switch the operation mode according to an autonomous driving condition.

The related art of the present disclosure is disclosed in Korean Patent No. 10-1779823 registered on Sep. 13, 2017 and entitled "Method for Switching Control Mode in Autonomous Vehicle and Apparatus thereof".

The conventional apparatus determine that a driver has intervened in steering when a preset holding time elapses under a condition in which column torque is equal to or more than a predetermined level during autonomous driving. Then, according to the column torque at this time, the apparatus turns off the autonomous driving mode by adjusting transition speed, and switches the operation mode to the driver mode.

However, when the driver suddenly steers the vehicle during autonomous driving, the preset holding time needs to elapse in order to determine whether the driver has intervened in steering. Thus, since the autonomous driving mode is not turned off during the preset holding time, the driver may have a sense of difference, and the vehicle may not be steered according to the driver's intention. Therefore, it is difficult to secure the driver's safety in case of emergency avoidance or under a sudden steering condition, if necessary.

When a sudden steering command such as obstacle avoidance is applied according to the intention of autonomous driving during autonomous driving, the autonomous driving mode is not turned off, but needs to be maintained.

As such, there is a need for an apparatus and method which can accurately determine a driver's steering intervention such that a sudden steering condition by the driver's steering intervention during autonomous driving and a sudden steering condition by the intention of autonomous driving can complement each other, and switch the operation mode to stably transfer a steering authority to the driver, thereby increasing the convenience and stability.

The above information disclosed in this Background section is only for enhancement of understanding of the background of the invention and, therefore, it may contain information that does not constitute prior art.

SUMMARY

Exemplary embodiments of the present invention are directed to an apparatus and method for controlling an MDPS, which can determine steering intervention by not only adjusting a reference torque map for determining steering intervention by reflecting a command steering angle by autonomous driving, but also adjusting a variable count according to the magnitude the column torque, such that a autonomous vehicle transitions from an autonomous driving mode to a driver mode, and adjust transition speed by adjusting a blending period of the autonomous driving mode and the driver mode based on the column torque at the time point that it is determined that a driver has intervened in steering, such that the mode transition can be rapidly performed in case of sudden steering.

In an embodiment, an apparatus for controlling an MDPS may include: a driving information input unit configured to receive driving information which is generated while a vehicle travels; a steering angle position control unit configured to receive a command steering angle for autonomous driving and a current motor steering angle of a driving motor, and output an autonomous driving command through position control; and an MDPS control unit configured to drive the driving motor based on the autonomous driving command inputted from the steering angle position control unit in an autonomous driving mode, determine whether a driver intervenes in steering, by adjusting a variable count according to the magnitude of column torque based on the command steering angle for autonomous driving and the driving information inputted from the driving information input unit during autonomous driving, calculate a driver command by the driver's steering according to whether the driver intervenes in steering, and change an operation mode from the autonomous driving mode to a driver mode while driving the driving motor with a compensation output between the driver command and the autonomous driving command, the compensation output being calculated by applying a final weight and a blending period for compensating for the autonomous driving command and the driver command.

The driving information input unit may receive one or more of the vehicle speed, a motor steering angle of the driving motor, and a steering angle, steering angular velocity and column torque by the driver's steering, which are generated while the vehicle travels.

The steering angle position control unit may receive error values of the command steering angle and the motor steering angle and filter the received error values, through a variable high-pass filter that varies a cutoff frequency according to a command steering angular velocity, and then adjust a position control gain and outputs the autonomous driving command.

The steering angle position control unit may lower the cutoff frequency when the command steering angular velocity is high, and raise the cutoff frequency when the command steering angular velocity is low.

The MDPS control unit may include: a steering control unit configured to calculate the driver command by the driver's steering, based on the vehicle speed, the steering angle and the column torque, which are inputted from the driving information input unit; a steering intervention determination unit configured to set a reference torque map for determining the driver's steering intervention based on the command steering angle, and determine the driver's steering intervention by adjusting a variable count according to the magnitude of the column torque based on the set reference torque map; a blending period calculation unit configured to calculate the blending period for compensating for the autonomous driving command and the driver command based on the column torque at the time point that the steering intervention determination unit determines that the driver has intervened in steering; a weight calculation unit configured to calculate the final weight for compensating for the autonomous driving command and the driver command according to the column torque and a steering angular velocity, when an operation mode is switched; and an output control unit configured to calculate the compensation output by compensating for the autonomous driving command and the driver command by applying the final weight, calculated through the weight calculation unit, according to the blending period calculated through the blending period calculation unit, and output the calculated compensation output, when the steering intervention determination unit determines that the driver has intervened in steering.

The steering intervention determination unit may include: a band stop filter configured to filter a vibration signal from the column torque based on a resonant frequency according to the steering angle acceleration; a command steering angle acceleration calculation unit configured to calculate command steering angle acceleration by performing second-order differentiation on the command steering angle and then performing low-pass filtering; and a determination output unit configured to set the reference torque map for determining the driver's steering intervention based on the command steering angle acceleration calculated through the command steering angle acceleration calculation unit, adjust the variable count according to the magnitude of the column torque filtered based on the reference torque map, count a holding period of the column torque, determine that the driver has intervened in steering when the torque holding period elapses, and output the determination result.

The magnitude of the column torque and the magnitude of the variable count may have a quadratic functional proportion relationship.

The reference torque map may have a slope that decreases as the command steering angle acceleration increases.

The weight calculation unit may acquire a first weight corresponding to the column torque from a column torque weight table in which a weight is matched with each column torque, acquire a second weight corresponding to the steering angular velocity from a steering angular velocity weight table in which a weight is matched with each steering angular velocity, and calculate the final weight by multiplying the first and second weights.

The output control unit may calculate the compensation output through an expression of [(1−final weight)*autonomous driving command+final weight*driver command], while increasing the final weight from 0 to 1 according to the blending period.

In an embodiment, a method for controlling an MDPS may include: receiving, by an MDPS control unit, an autonomous driving command from a steering angle position control unit and driving a driving motor, in an autonomous driving mode; determining, by the MDPS control unit, whether a driver intervenes in steering, by adjusting a variable count according to the magnitude of column torque, based on a command steering angle for autonomous driving and driving information inputted from a driving information input unit during autonomous driving; calculating, by the MDPS control unit, a driver command by the driver's steering, when determining that the driver has intervened in steering; calculating, by the MDPS control unit, a compensation output between the autonomous driving command and the driver command by applying a final weight and a blending period for compensating for the autonomous driving command and the driver command; and changing, by the MDPS control unit, an operation mode from the autonomous driving mode to a driver mode while driving the driving motor with the compensation output.

The determining of whether the driver intervenes in steering may include: setting, by the MDPS control unit, a reference torque map for determining the driver's steering intervention based on the command steering angle; adjusting, by the MDPS control unit, the variable count according to the magnitude of the column torque based on the set reference torque map; and counting, by the MDPS control unit, a holding period of the column torque by adjusting the variable count, and determining that the driver has intervened in steering, when a set holding period elapses.

The setting of the reference torque map may include setting, by the MDPS control unit, the reference torque map based on command steering angle acceleration calculated by performing second-order differentiation on the command steering angle and then performing low-pass filtering, wherein the reference torque map has a slope that decreases as the command steering angle acceleration increases.

The magnitude of the column torque and the magnitude of the variable count may have a quadratic functional proportion relationship.

The calculating of the compensation output may include: calculating, by the MDPS control unit, the blending period for compensating for the autonomous driving command and the driver command based on the column torque at the time point that the MDPS control unit determines that the driver has intervened in steering; calculating, by the MDPS control unit, the final weight for compensating for the autonomous driving command and the driver command according to the column torque and a steering angular velocity; and calculating, by the MDPS control unit, the compensation output by compensating for the autonomous driving command and the driver command by applying the final weight according to the calculated blending period.

The calculating of the final weight may include acquiring, by the MDPS control unit, a first weight corresponding to the column torque from a column torque weight table in which a weight is matched with each column torque, acquiring a second weight corresponding to the steering angular velocity from a steering angular velocity weight table in which a weight is matched with each steering angular velocity, and calculating the final weight by multiplying the first and second weights.

The calculating of the compensation output may include calculating, by the MDPS control unit, the compensation output through an expression of [(1−final weight)*autonomous driving command+final weight*driver command], while increasing the final weight from 0 to 1 according to the blending period.

The method may further include receiving, by the steering angle position control unit, error values of the command steering angle and the motor steering angle and filtering the received error values, through a variable high-pass filter that varies a cutoff frequency according to a command steering angular velocity, and then adjusting a position control gain and outputting the autonomous driving command to the MDPS control unit.

When varying the cutoff frequency, the MDPS control unit may lower the cutoff frequency in the case that the command steering angular velocity is high, and raise the cutoff frequency in the case that the command steering angular velocity is low.

In accordance with the embodiments of the present disclosure, the apparatus and method for controlling an MDPS in accordance with the embodiment of the present disclosure may determine steering intervention by not only adjusting the reference torque map for determining steering intervention by reflecting the command steering angle by autonomous driving, but also adjusting the variable count according to the magnitude of the column torque, such that the autonomous vehicle transitions from the autonomous driving mode to the driver mode. Furthermore, the apparatus and method may adjust the transition speed by adjusting the blending period of the autonomous driving mode and the driver mode based on the column torque at the time point that it is determined that the driver has intervened in steering, and thus accurately determine the driver's steering intervention such that the sudden steering condition by the driver's steering intervention and the sudden steering condition by the intention of the autonomous driving can complement each other during autonomous driving. Therefore, the apparatus and method can stably transfer a steering authority to the driver without a sense of difference, thereby increasing the convenience and stability and improving noise robustness for the command steering angle in the autonomous driving mode. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
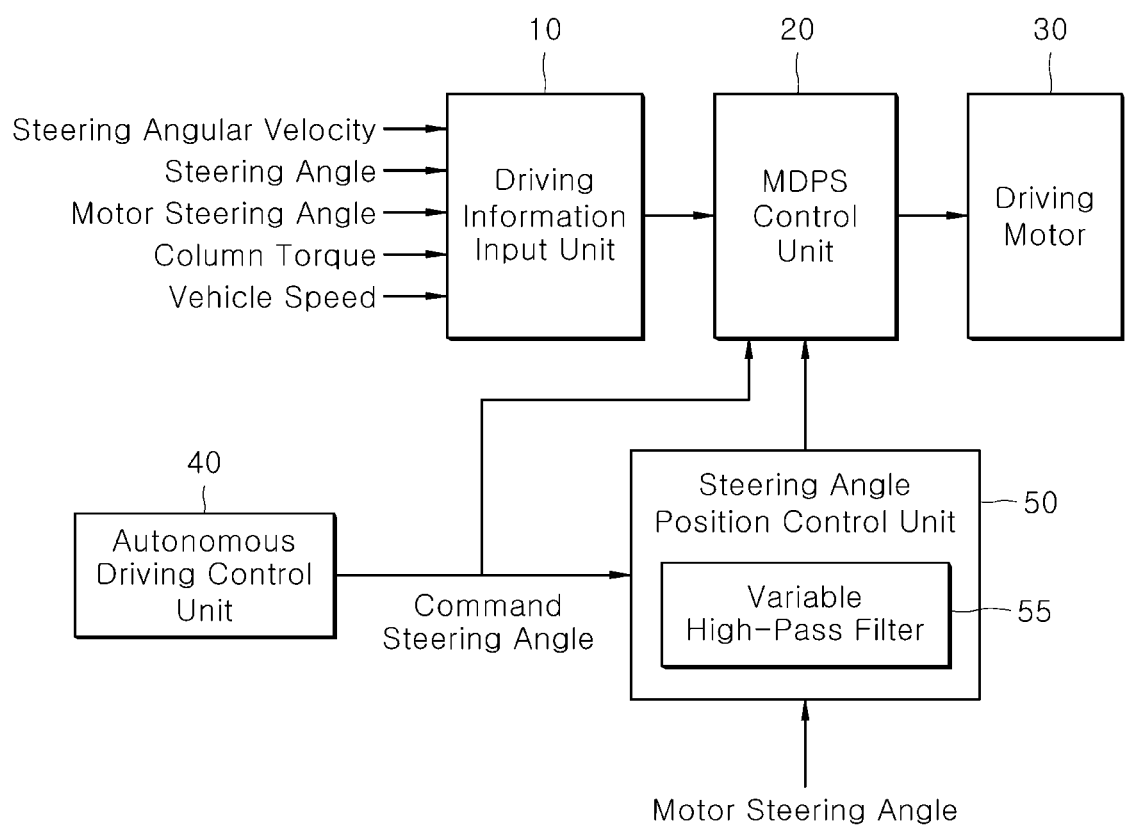
FIG. 1 is a configuration diagram schematically illustrating an apparatus for controlling an MPDS in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, an apparatus and method for controlling an MDPS (Motor-Driven Power Steering) will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
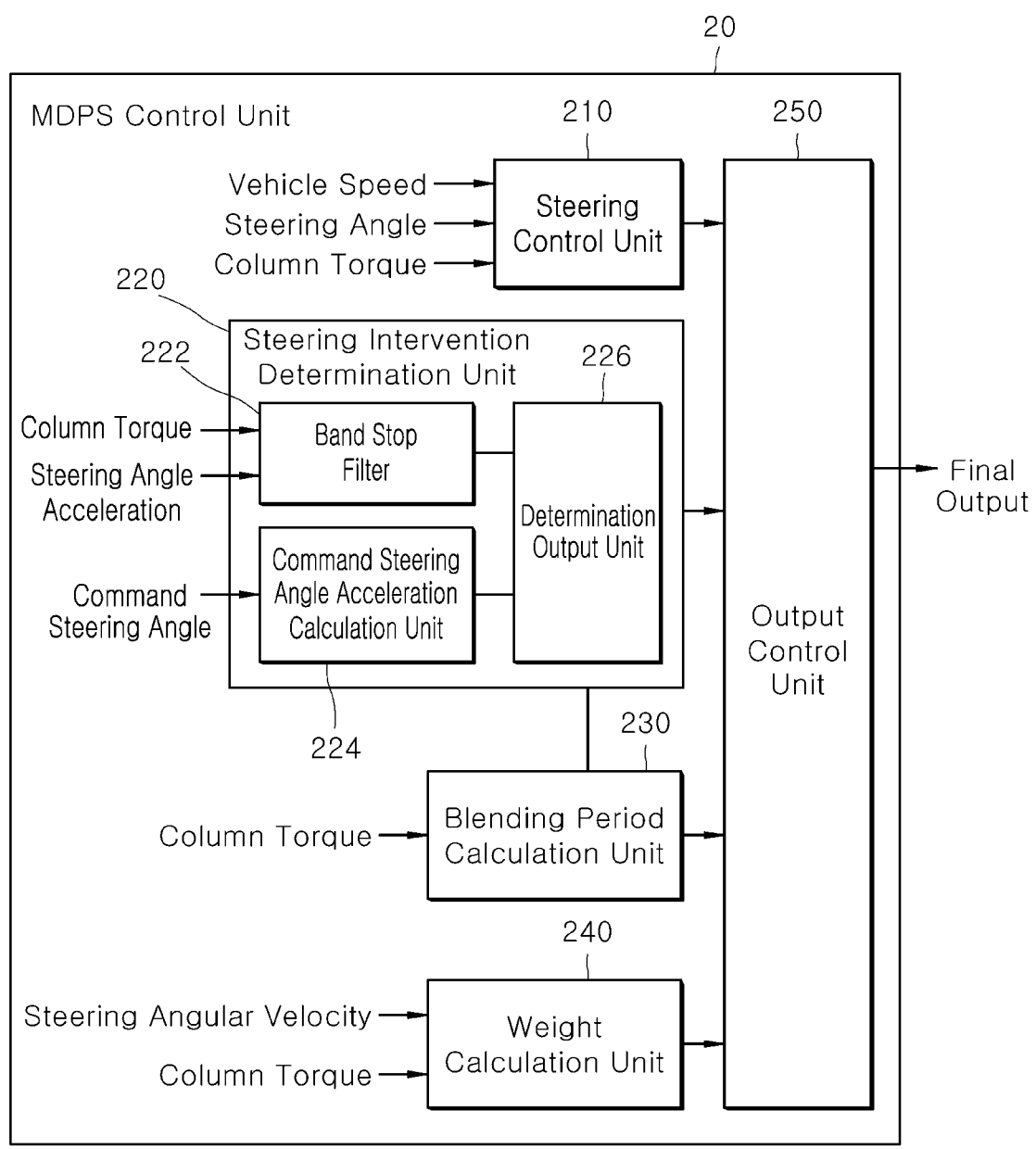
FIG. 2 is a block diagram more concretely illustrating an MDPS control unit in the apparatus for controlling an MPDS in accordance with the embodiment of the present disclosure.
Figure 3:
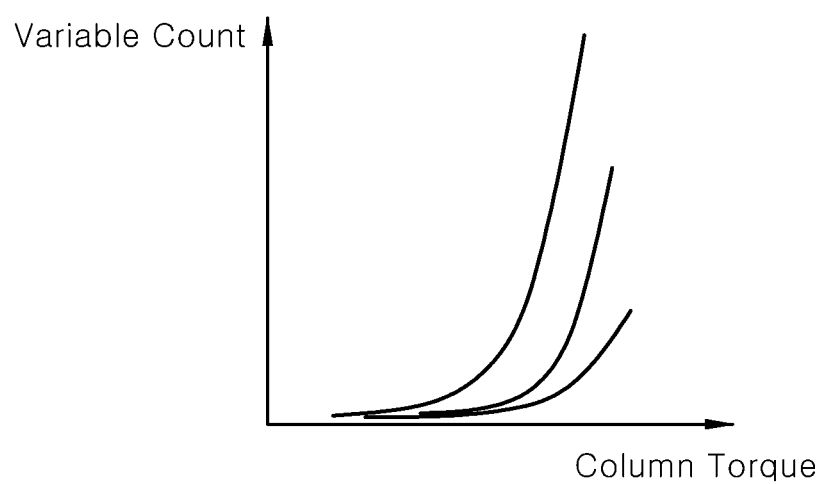
FIG. 3 is a graph illustrating the relationship between column torque and variable count in the apparatus for controlling an MPDS in accordance with the embodiment of the present disclosure.
Figure 4:
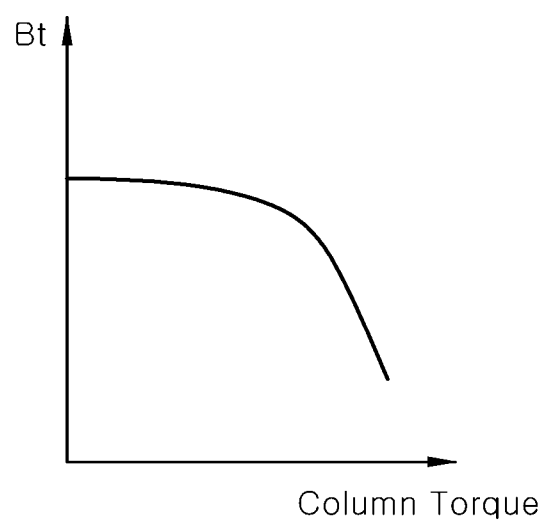
FIG. 4 is a graph illustrating a blending period for column torque in the apparatus for controlling an MPDS in accordance with the embodiment of the present disclosure.
Figure 5A:
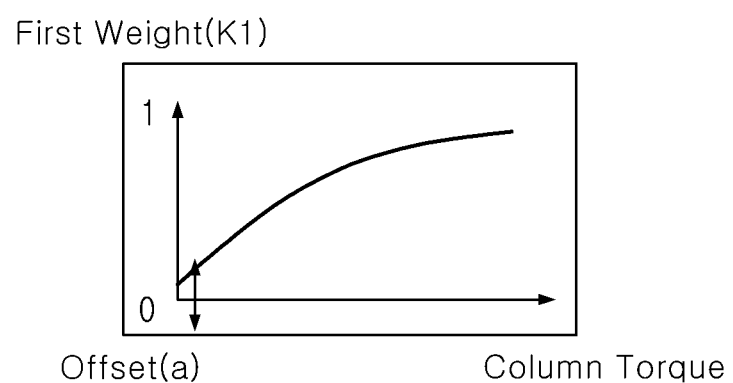
FIG. 5A is a graph for describing a first weight in the apparatus for controlling an MPDS in accordance with the embodiment of the present disclosure.
Figure 5B:
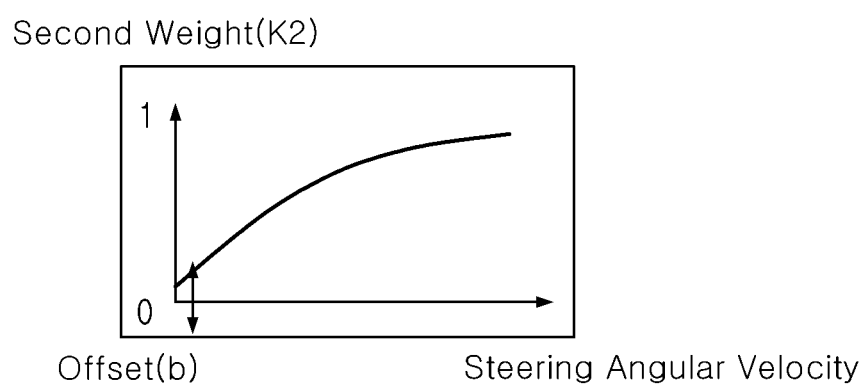
FIG. 5B is a graph for describing a second weight in the apparatus for controlling an MPDS in accordance with the embodiment of the present disclosure.

FIG. 1 is a configuration diagram schematically illustrating an apparatus for controlling an MPDS in accordance with an embodiment of the present disclosure, FIG. 2 is a block diagram more concretely illustrating an MDPS control unit in the apparatus for controlling an MPDS in accordance with the embodiment of the present disclosure, FIG. 3 is a graph illustrating the relationship between column torque and variable count in the apparatus for controlling an MPDS in accordance with the embodiment of the present disclosure, FIG. 4 is a graph illustrating a blending period for column torque in the apparatus for controlling an MPDS in accordance with the embodiment of the present disclosure, FIG. 5A is a graph for describing a first weight in the apparatus for controlling an MPDS in accordance with the embodiment of the present disclosure, and FIG. 5B is a graph for describing a second weight in the apparatus for controlling an MPDS in accordance with the embodiment of the present disclosure.

As illustrated in FIGS. 1 and 2, the apparatus for controlling an MPDS in accordance with the embodiment of the present disclosure may include a driving information input unit 10, a steering angle position control unit 50 and an MDPS control unit 20.

The driving information input unit 10 may receive driving information which is generated while the vehicle travels, and provide the received information to the MDPS control unit 20, such that the MDPS control unit 20 calculates a driver command according to a driver' steering intervention and the driver's steering, and controls a driving motor 30.

The driving information may include one or more of the speed of the vehicle, a motor steering angle of the driving motor 30, and a steering angle, steering angular velocity and column torque by the driver's steering, which are generated while the vehicle travels.

The steering angle position control unit 50 may receive a command steering angle for autonomous driving from an autonomous driving control unit 40, receive the current motor steering angle of the driving motor 30, output an autonomous driving command to the MDPS control unit 20 through position control, and control the driving motor 30 to perform steering in an autonomous driving mode.

The steering angle position control unit 50 may receive error values of the command steering angle and the motor steering angle, filter the received error values through a variable high-pass filter 55 which varies a cutoff frequency according to a command steering angular velocity, and then adjust a position control gain and output an autonomous driving command.

Therefore, when the command steering angular velocity is high, the steering angle position control unit 50 may lower the cutoff frequency and thus raise a required gain and frequency response of a steering region. When the command steering angular velocity is low, the steering angle position control unit 50 may raise the cutoff frequency and thus not only make the variable high-pass filter insensitive to noise, such that the variable high-pass filter does not react to vibration or disturbance, but also significantly improve responsiveness.

At this time, the command steering angular velocity may be calculated by differentiating the command steering angle.

The MDPS control unit 20 may drive the driving motor 30 based on the autonomous driving command inputted from the steering angle position control unit 50 in the autonomous driving mode.

The MDPS control unit 20 may determine whether the driver has intervened in steering, by adjusting a variable count according to the magnitude of column torque, based on the driving information inputted from the driving information input unit 10 during autonomous driving and the command steering angle for autonomous driving, calculate a driver command based on the driver's steering according to whether the driver has intervened in steering, and then change the operation mode from the autonomous driving mode to the driver mode while driving the driving motor 30 with a compensation output between the autonomous driving command and the driver command, which are calculated by applying a blending period and a final weight for compensating for the autonomous driving command and the driver command.

The MDPS control unit 20 may include a steering control unit 210, a steering intervention determination unit 220, a blending period calculation unit 230, a weight calculation unit 240 and an output control unit 250.

The steering control unit 210 may calculate the driver command according to the driver's steering, based on the vehicle speed, the steering angle and the column torque which are inputted from the driving information input unit 10. That is, the steering control unit 210 may generate an assistance force when the driver steers the vehicle in the driver mode.

The steering intervention determination unit 220 may set a reference torque map for determining the driver's steering intervention, based on the command steering angle outputted from the autonomous driving control unit 40, count the holding period of the column torque by adjusting the variable count according to the magnitude of the column torque, based on the set reference torque map, and determine that the driver has intervened in steering when the torque holding period elapses.

The steering intervention determination unit 220 may include a band stop filter 222, a command steering angle acceleration calculation unit 224 and a determination output unit 226.

The band stop filter 222 may filter a vibration signal from the column torque based on a resonant frequency according to steering angle acceleration.

When determining whether the driver has intervened in steering, the steering intervention determination unit 220 needs to filter column torque caused by unintended steering intervention of the driver, in order to solve the problem that the autonomous driving mode is unintentionally turned off, when the torque holding period elapses under a condition in which the column torque caused by the unintended steering intervention is equal to or more than a predetermined level.

At this time, when the column torque is caused by the unintended steering intervention, vibration is generated at a predetermined frequency by the influence of a torsion bar, a steering wheel or a U-joint of the MDPS. Therefore, a resonant frequency in which the inertia and stiffness of the steering wheel and the torsion bar in the MPDS are considered may be found to remove the column torque through a filtering operation of the band bass filter.

Since the resonant frequency according to the steering angle acceleration differs depending on the characteristic of the vehicle, the resonant frequency may be set by a tuning map obtained through a test. For example, a resonant frequency of about 8 to 10 Hz may be derived on a test vehicle basis.

The command steering angle acceleration calculation unit 224 may calculate the command steering angle acceleration by performing second-order differentiation on the command steering angle outputted from the autonomous driving control unit 40 and then performing low-pass filtering.

The determination output unit 226 may set a reference torque map for determining the driver's steering intervention, based on the command steering angle acceleration calculated by the command steering angle acceleration calculation unit 224, as illustrated in FIG. 3.

At this time, the magnitude of the column torque and the variable count in the reference torque map have a quadratic functional proportional relationship. The larger the command steering angle acceleration, the slope of the reference torque map is set to the smaller value.

In the present embodiment, the MDPS control unit may determine the driver's steering intervention by considering even a condition such as sudden obstacle avoidance in the autonomous driving mode.

Even when a sudden steering command such as obstacle avoidance is applied from the autonomous driving control unit 40, actual column torque is significantly increased. In this case, since the column torque is increased according to the intention of the autonomous driving, the autonomous driving mode must not be turned off.

Therefore, the MDPS control unit 20 may calculate the command steering angle acceleration based on the command steering angle issued in the autonomous driving mode, and adjust the reference torque map for setting the variable count value, based on the calculated command steering angle acceleration.

That is, the MDPS control unit 20 may set the slope to a smaller value as the command steering angle acceleration is increased, such that the variable count is reduced according to the magnitude of the column torque. Thus, the condition for determining the driver's steering intervention may be set to a more strict condition such that steering intervention determination start torque is increased and the torque holding period is also increased while the variable count is reduced.

As such, when the column torque is increased by sudden steering in the autonomous driving mode even while the driver does not turn the steering wheel, the autonomous driving mode may not be turned off but be maintained. However, the MDPS control unit may adjust the steering intervention start torque and the variable count by adjusting the reference torque map for each command steering angle acceleration, such that the sudden steering condition based on the driver's steering intervention and the sudden steering condition based on the intention of the autonomous driving control unit 40 can complement each other.

The determination output unit 226 may adjust the variable count according to the magnitude of the column torque which is filtered based on the reference torque map, and then count the holding period of the column torque. When the torque holding period elapses, the determination output unit 226 may determine that the driver has intervened in steering, and output the determination result.

As such, the determination output unit 226 may variably increase the variable count according to the column torque which is generated in case of the driver's steering intervention, such that a driver steering intervention time rapidly arrives under the sudden steering condition in which the column torque is high.

For example, when driver steering detection start torque is 4 Nm, the variable count may be 1 at a column torque of 4 Nm, 2 at a column torque of 5 Nm, 3 at a column torque of 6 Nm, 4 at a column torque of 7 Nm, and 5 at a column torque of 8 Nm. That is, the larger the column torque based on the reference torque map, the larger the variable count.

When the variable count is adjusted in such a manner, the torque holding time is satisfied only in 30 ms when the column torque is 8 Nm, under the supposition that a torque holding period of 150 ms is required for a column torque of 4 Nm in the case that the current column torque is 8 Nm and the torque holding period is 150 ms. Therefore, when the driver suddenly steers the vehicle, the variable count is increased while the column torque is increased. Thus, as the torque holding period is rapidly satisfied, the operation mode can immediately transition to the driver mode.

The blending period calculation unit 230 may calculate a blending period for compensating for the autonomous driving command and the driver command based on the column torque at the time point that the steering intervention determination unit 220 determines that the driver has intervened in steering.

As illustrated in FIG. 4, the blending period may be exponentially set to a table according to the column torque. In this case, when the column torque is high at the time point that the steering intervention determination unit 220 determines that the driver has intervened in steering, a blending period Bt may be decreased so that the operation mode transitions within a short time. On the other hand, when the column torque is low, the blending period Bt may be increased while slowly changed. Thus, the operation mode transitions without a sense of difference.

The weight calculation unit 240 may calculate a final weight for compensating for the autonomous driving command and the driver command according to the steering angular velocity and the column torque, when the operation mode is switched.

The weight calculation unit 240 may calculate the final weight by multiplying a first weight corresponding to the column torque by a second weight corresponding to the steering angular velocity. That is, when the driver holds the steering wheel to steer the vehicle during autonomous driving of the vehicle, the vehicle needs to be continuously driven so that the autonomous driving mode and the driver mode complement each other, while a command for completely turning off the autonomous driving mode is not applied to the autonomous driving control unit 40. Thus, the weight calculation unit 240 may calculate the final weight using the first weight corresponding to the column torque and the second weight corresponding to the steering angular velocity.

Basically, the driver does not hold the steering wheel during autonomous driving, and thus the column torque converges to almost '0'. That is, during autonomous driving, steering is performed as long as only the driving motor 30 is driven, and the torsion bar is hardly distorted because the driver does not hold the steering wheel. Therefore, the column torque may be almost '0'. However, while the autonomous driving is normally performed, the steering wheel may minutely shake. Thus, under a condition of a predetermined offset or less, the weight calculation unit 240 determines that the autonomous driving is normally performed, and thus sets a first weight K1 such that the autonomous driving is performed at an output of 100%. Such a first weight has a predetermined offset (a) as illustrated in FIG. 5A, and is increased as the magnitude of the column torque is increased.

When a rapid yaw or lateral acceleration occurs while the driver does not hold the steering wheel during autonomous driving, the driver has a sense of significant difference. Thus, during autonomous driving, the steering angular velocity is not so high. In this case, the weight calculation unit 240 sets a second weight K2 such that the weight is applied at 100% within a predetermined steering angular velocity during autonomous driving. However, when the driver wants to suddenly steer the vehicle, the weight calculation unit 240 raises the second weight K2 such that the final weight K1*K2 converges to '1', thereby turning off the autonomous driving mode. Such a second weight has a predetermined offset (b) as illustrated in FIG. 5B, and is increased according to the steering angular velocity.

When the driver intervenes in steering during autonomous driving of the vehicle, column torque is generated while the torsion bar is distorted. When the magnitude of the column torque is increased, the driver has a sense of significant difference. That is, the driver feels that the vehicle is not steered according to the driver's intention, while feeling a large force in the hand. In order to remove such inconvenience of the driver, the weight calculation unit 240 may acquire the first weight corresponding to the magnitude of the current column torque from the column torque weight table and the second weight corresponding to the current steering angular velocity from the steering angular velocity weight table, and calculate the final weight K by multiplying the first and second weights K1 and K2.

When the steering intervention determination unit 220 determines that the driver has intervened in steering, the output control unit 250 may apply the final weight calculated by the weight calculation unit 240 according to the blending period calculated by the blending period calculation unit 230, calculate a compensation output by compensating for the autonomous driving command and the driver command, and output the compensation output.

That is, the output control unit 250 may calculate the compensation output through an exponential smoothing filter based on an expression of [(1−final weight)*autonomous driving command+final weight*driver command], while increasing the final weight from 0 to 1 according to the blending period. When the final weight is 0, the autonomous driving command may be calculated as a compensation output of 100%. When the final weight is 1, the driver command may be calculated as a compensation output of 100%.

Therefore, when the operation mode needs or does not need to rapidly transition according to the steering angular velocity of the driver in each situation, outputs may be slowly blended. Thus, when the operation mode transitions from the autonomous driving mode to the driver mode due to the driver's steering intervention, a smooth steering feel may be provided.

As described above, the apparatus for controlling an MDPS in accordance with the embodiment of the present disclosure may determine steering intervention by not only adjusting the reference torque map for determining steering intervention by reflecting the command steering angle by autonomous driving, but also adjusting the variable count according to the magnitude of the column torque, such that the autonomous vehicle transitions from the autonomous driving mode to the driver mode. Furthermore, the apparatus may adjust the transition speed by adjusting the blending period of the autonomous driving mode and the driver mode based on the column torque at the time point that it is determined that the driver has intervened in steering, and thus accurately determine the driver's steering intervention such that the sudden steering condition by the driver's steering intervention and the sudden steering condition by the intention of the autonomous driving can complement each other during autonomous driving. Therefore, the apparatus can stably transfer a steering authority to the driver without a sense of difference, thereby increasing the convenience and stability and improving noise robustness for the command steering angle in the autonomous driving mode.

Figure 6:
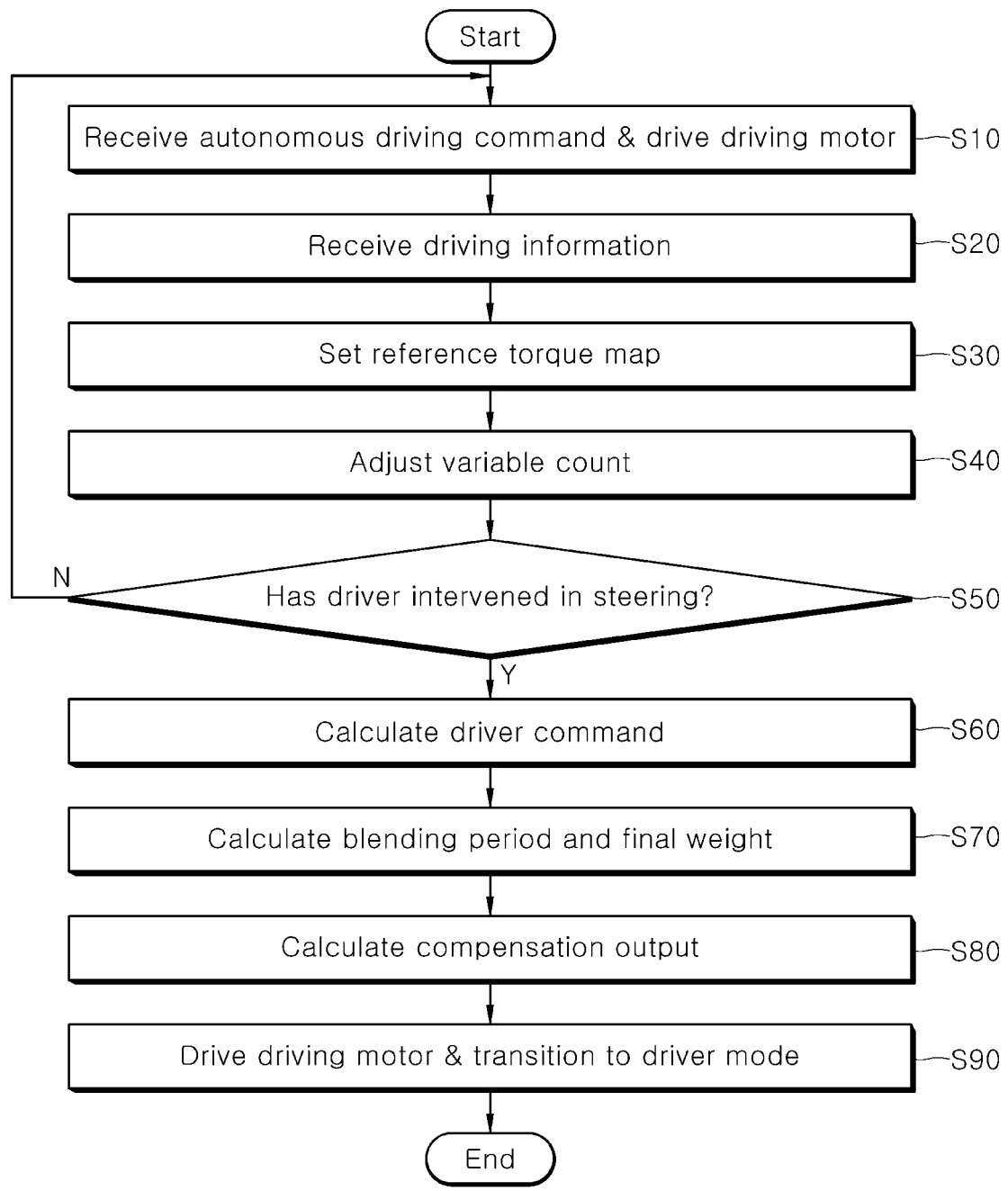
FIG. 6 is a flowchart for describing a method for controlling an MDPS in accordance with an embodiment of the present disclosure.

FIG. 6 is a flowchart for describing a method for controlling an MDPS in accordance with an embodiment of the present disclosure.

As illustrated in FIG. 6, the method for controlling an MDPS in accordance with the embodiment of the present disclosure starts with step S10 in which the MDPS control unit 20 receives an autonomous driving command from the steering angle position control unit 50 in the autonomous driving mode, and drives the driving motor 30.

The steering angle position control unit 50 may receive error values of a command steering angle and a motor steering angle through the variable high-pass filter 55 which varies a cutoff frequency according to a command steering angular velocity, filter the received error values, and then adjust a position control gain and output the autonomous driving command to the MDPS control unit 20.

When varying the cutoff frequency of the variable high-pass filter 55, the steering angle position control unit 50 may lower the cutoff frequency and thus raise a required gain and frequency response of the steering region in the case that the command steering angular velocity is high. Furthermore, when the command steering angular velocity is low, the steering angle position control unit 50 may raise the cutoff frequency and thus not only make the variable high-pass filter insensitive to noise, such that the variable high-pass filter does not react to vibration or disturbance, but also significantly improve responsiveness.

While driving the driving motor 30 according to the autonomous driving command received in step S10, the MDPS control unit 20 receives the driving information of a vehicle from the driving information input unit 10 during autonomous driving in step S20.

The driving information of the vehicle may include one or more of the vehicle speed, a motor steering angle of the driving motor 30, and a steering angle, steering angular velocity and column torque by a driver's steering, which are generated while the vehicle travels.

The MDPS control unit 20 sets a reference torque map for determining the driver's steering intervention based on the command steering angle outputted from the autonomous driving control unit 40, in step S30.

In the present embodiment, the MDPS control unit may determine the driver's steering intervention by considering even a condition such as sudden obstacle avoidance in the autonomous driving mode.

Even when a sudden steering command such as obstacle avoidance is applied from the autonomous driving control unit 40, actual column torque is significantly increased. In this case, since the column torque is increased according to the intention of the autonomous driving, the autonomous driving mode must not be turned off.

Therefore, the MDPS control unit 20 may calculate the command steering angle acceleration based on the command steering angle issued in the autonomous driving mode, and adjust the reference torque map for setting a variable count value, based on the command steering angle acceleration.

The MDPS control unit 20 may calculate the command steering angular velocity by performing second-order differentiation on the command steering angle and then performing low-pass filtering.

As illustrated in FIG. 3, the magnitude of the column torque and the magnitude of the variable count in the reference torque map have a quadratic functional proportional relationship, and the slope of the reference torque map decreases as the command steering angle acceleration increases.

That is, the MDPS control unit 20 may set the slope to a smaller value as the command steering angle acceleration is increased, such that the variable count is reduced according to the magnitude of the column torque. Thus, the condition for determining whether the driver has intervened in steering may be set to a more strict condition such that the steering intervention determination start torque is increased and the torque holding period is also increased while the variable count is reduced.

As such, when the column torque is increased by sudden steering in the autonomous driving mode even while the driver does not turn the steering wheel, the autonomous driving mode may not be turned off but be maintained. However, the MDPS control unit 20 may adjust the steering intervention start torque and the variable count by adjusting the reference torque map for each command steering angle acceleration, such that the sudden steering condition based on the driver's steering intervention and the sudden steering condition based on the intention of the autonomous driving control unit 40 can complement each other.

After setting the reference torque map in step S30, the MDPS control unit 20 adjusts the variable count according to the magnitude of the column torque, based on the set reference torque map, in step S40.

The MDPS control unit 20 may filter and remove a vibration signal from the column torque based on the resonant frequency according to the steering angular acceleration.

That is, when determining whether the driver has intervened in steering, the MDPS control unit 20 needs to filter column torque caused by unintended steering intervention of the driver, in order to solve the problem that the autonomous driving mode is unintentionally turned off, when the torque holding period elapses under a condition in which the column torque caused by the unintended steering intervention is equal to or more than a predetermined level.

At this time, when the column torque is caused by the unintended steering intervention, vibration is generated at a predetermined frequency by the influence of a torsion bar, a steering wheel or a U-joint of the MDPS. Therefore, a resonant frequency in which the inertia and stiffness of the steering wheel and the torsion bar in the MPDS are considered may be found to remove the column torque through a filtering operation of the band bass filter.

Since the resonant frequency according to the steering angle acceleration differs depending on the characteristic of the vehicle, the resonant frequency may be set by a tuning map obtained through a test. For example, a resonant frequency of about 8 to 10 Hz may be derived on a test vehicle basis.

After adjusting the variable count according to the magnitude of the column torque in step S40, the MDPS control unit 20 counts the holding period of the column torque, and compares the counted holding period to a preset holding period, in order to determine whether the driver has intervened in steering, in step S50.

As such, the MDPS control unit 20 may variably adjust the variable count according to the column torque which occurs in case of the driver's steering intervention, such that the driver steering intervention time rapidly arrives under the sudden steering condition in which the column torque is high.

For example, when the driver steering detection start torque is 4 Nm, the variable count may be 1 at a column torque of 4 Nm, 2 at a column torque of 5 Nm, 3 at a column torque of 6 Nm, 4 at a column torque of 7 Nm, and 5 at a column torque of 8 Nm. That is, the larger the column torque based on the reference torque map, the larger the variable count. When the variable count is adjusted in such a manner, the torque holding time is satisfied only in 30 ms when the column torque is 8 Nm, under the supposition that a torque holding period of 150 ms is required for a column torque of 4 Nm in the case that the current column torque is 8 Nm and the torque holding period is 150 ms. Therefore, when the driver suddenly steers the vehicle, the variable count is increased while the column torque is increased. Thus, as the torque holding period is rapidly satisfied, the operation mode immediately transitions to the driver mode.

When the driver does not intervene in steering after determining whether the driver has intervened in steering in step S50, the MDPS control unit 20 returns to step S10 while maintaining the autonomous driving mode, and drives the driving motor 30 according to the autonomous driving command.

On other hand, when the determination result of step S50 indicates that the driver has intervened in steering, the MDPS control unit 20 calculates a driver command according to the driver's steering, based on the input driving information, in step S60.

The MDPS control unit 20 may calculate the driver command according to the driver's steering, based on the vehicle speed, the steering angle and the column torque, which are inputted thereto. That is, the MDPS control unit 20 may generate an assistance force when the driver steers the vehicle in the driver mode.

After calculating the driver command according to the driver's steering based on the vehicle speed, the steering angle and the column torque of the driving information in step S60, the MDPS control unit 20 calculates a blending period for compensating for the autonomous driving command and the driver command based on the column torque at the time point that it is determined that the driver has intervened in steering, and calculates the final weight for compensating for the autonomous driving command and the driver command according to the column torque and the steering angular velocity, in step S70.

As illustrated in FIG. 4, the MDPS control unit 20 may exponentially set the blending period to a table according to the column torque. In this case, when the column torque is high at the time point that it is determined that the driver has intervened in steering, the blending period Bt may be decreased so that the operation mode transitions within a short time. On the other hand, when the column torque is low, the blending period Bt may be increased while slowly changed. Thus, the operation mode transitions without a sense of difference.

The MDPS control unit 20 may calculate the final weight K by multiplying a first weight K1 corresponding to the column torque and a second weight K2 corresponding to the steering angular velocity. That is, when the driver holds the steering wheel to steer the vehicle during autonomous driving of the vehicle, the vehicle can be continuously driven so that the autonomous driving mode and the driver mode complement each other according to the calculated final weight, while a command for completely turning off the autonomous driving mode is not applied to the autonomous driving control unit 40.

After calculating the blending period and the weight in step S70, the MDPS control unit 20 applies the final weight according to the calculated blending period, calculates a compensation output by compensating for the autonomous driving command and the driver command, and outputs the compensation output, in step S80.

That is, the MDPS control unit 20 may calculate the compensation output through an exponential smoothing filter based on an expression of [(1−final weight)*autonomous driving command+final weight*driver command], while increasing the final weight from 0 to 1 according to the blending period.

When the final weight is 0, the autonomous driving command may be calculated as a compensation output of 100%. When the final weight is 1, the driver command may be calculated as a compensation output of 100%.

After calculating the compensation output in step S80, the MDPS control unit 20 changes the operation mode from the autonomous driving mode to the driver mode while driving the driving motor 30 with the compensation output, in step S90.

As described above, the method for controlling an MDPS in accordance with the embodiment of the present disclosure may determine steering intervention by not only adjusting the reference torque map for determining steering intervention by reflecting the command steering angle by autonomous driving, but also adjusting the variable count according to the magnitude of the column torque, such that the autonomous vehicle transitions from the autonomous driving mode to the driver mode. Furthermore, the method may adjust the transition speed by adjusting the blending period of the autonomous driving mode and the driver mode based on the column torque at the time point that it is determined that the driver has intervened in steering, and thus accurately determine the driver's steering intervention such that the sudden steering condition by the driver's steering intervention and the sudden steering condition by the intention of the autonomous driving can complement each other during autonomous driving. Therefore, the method can stably transfer a steering authority to the driver without a sense of difference, thereby increasing the convenience and stability and improving noise robustness for the command steering angle in the autonomous driving mode.

The embodiments described in this specification may be implemented with a method or process, a device, a software program, a data stream or a signal, for example. Although the embodiments have been discussed in a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a motor-driven power steering (MDPS), comprising:
   a driving information input configured to receive driving information generated while a vehicle travels;
   a steering angle position controller configured to receive a command steering angle for autonomous driving and a current motor steering angle of a driving motor, and output an autonomous driving command through position control; and
   an MDPS controller configured to:
   drive the driving motor based on the autonomous driving command inputted from the steering angle position controller in an autonomous driving mode,
   determine driver's steering intervention indicating whether the driver intervenes in steering, by adjusting a variable count according to a magnitude of column torque based on the command steering angle for the autonomous driving and the driving information inputted from the driving information input during the autonomous driving,
   is calculate a driver command by steering of the driver according to whether the driver intervenes in steering, and
   change an operation mode from the autonomous driving mode to a driver mode while driving the driving motor with a compensation output between the driver command and the autonomous driving command, the compensation output being calculated by applying a final weight and a blending period for compensating for the autonomous driving command and the driver command.

2. The apparatus of claim 1, wherein the driving information input receives one or more of a vehicle speed, a motor steering angle of the driving motor, a steering angle, steering angular velocity, and the column torque by steering of the driver, which are generated while the vehicle travels.

3. The apparatus of claim 2, wherein the MDPS controller comprises:
   a steering controller configured to calculate the driver command by steering of the driver, based on the vehicle speed, the steering angle and the column torque, which are inputted from the driving information input;
   a steering intervention determiner configured to set a reference torque map for determining the driver's steering intervention based on the command steering angle, and determine the driver's steering intervention by adjusting a variable count according to the magnitude of the column torque based on the set reference torque map;
   a blending period calculator configured to calculate the blending period for compensating for the autonomous driving command and the driver command based on the column torque when the steering intervention determiner determines that the driver intervenes in steering;
   a weight calculator configured to calculate the final weight for compensating for the autonomous driving command and the driver command according to the column torque and the steering angular velocity when the operation mode is switched; and
   an output controller configured to calculate the compensation output by compensating for the autonomous driving command and the driver command by applying the final weight, calculated through the weight calculator, according to the blending period calculated through the blending period calculator, and output the calculated compensation output when the steering intervention determiner determines that the driver intervenes in steering.

4. The apparatus of claim 3, wherein the weight calculator acquires a first weight corresponding to the column torque from a column torque weight table in which a weight is matched with each column torque, acquires a second weight corresponding to the steering angular velocity from a steering angular velocity weight table in which a weight is matched with each steering angular velocity, and calculates the final weight by multiplying the first and second weights.

5. The apparatus of claim 3, wherein the output controller calculates the compensation output through an expression of [(1−final weight)*autonomous driving command+final weight*driver command] by increasing the final weight from 0 to 1 according to the blending period.

6. The apparatus of claim 3, wherein the steering intervention determiner comprises:
a band stop filter configured to filter a vibration signal from the column torque based on a resonant frequency according to the steering angle acceleration;
a command steering angle acceleration calculator configured to calculate command steering angle acceleration by performing second-order differentiation on the command steering angle and then performing low-pass filtering; and
a determination output configured to set the reference torque map for determining the driver's steering intervention based on the command steering angle acceleration calculated through the command steering angle acceleration calculator, adjust the variable count according to the magnitude of the column torque filtered based on the reference torque map, count a holding period of the column torque, determine whether the driver intervenes in steering when the torque holding period elapses, and output the determination result.

7. The apparatus of claim 6, wherein the magnitude of the column torque and a magnitude of the variable count have a quadratic functional proportion relationship.

8. The apparatus of claim 6, wherein the reference torque map has a slope that decreases as the command steering angle acceleration increases.

9. The apparatus of claim 1, wherein the steering angle position controller receives error values of the command steering angle and a motor steering angle and filters the received error values, through a variable high-pass filter that varies a cutoff frequency according to a command steering angular velocity, and then adjusts a position control gain and outputs the autonomous driving command.

10. The apparatus of claim 9, wherein the steering angle position controller decreases the cutoff frequency when the command steering angular velocity is high, and increases the cutoff frequency when the command steering angular velocity is low.

11. A method for controlling a motor-driven power steering (MDPS), comprising the steps of:
receiving, by an MDPS controller, an autonomous driving command from a steering angle position controller and driving a driving motor, in an autonomous driving mode;
determining, by the MDPS controller, driver's steering intervention indicating whether the driver intervenes in steering, by adjusting a variable count according to a magnitude of column torque, based on a command steering angle for the autonomous driving and driving information inputted from a driving information inputter during the autonomous driving;
calculating, by the MDPS controller, a driver command by steering of the driver, when determining that the driver intervenes in steering;
calculating, by the MDPS controller, a compensation output between the autonomous driving command and the driver command by applying a final weight and a blending period for compensating for the autonomous driving command and the driver command; and
changing, by the MDPS controller, an operation mode from the autonomous driving mode to a driver mode while driving the driving motor with the compensation output.

12. The method of claim 11, wherein the step of determining whether the driver intervenes in steering comprises the steps of:
setting, by the MDPS controller, a reference torque map for determining the driver's steering intervention based on the command steering angle;
adjusting, by the MDPS controller, the variable count according to the magnitude of the column torque based on the set reference torque map; and
counting, by the MDPS controller, a holding period of the column torque by adjusting the variable count, and determining that the driver intervenes in steering when a set holding period elapses.

13. The method of claim 12, wherein the step of setting the reference torque map comprises the step of setting, by the MDPS controller, the reference torque map based on command steering angle acceleration calculated by performing second-order differentiation on the command steering angle and then performing low-pass filtering, wherein the reference torque map has a slope that decreases as the command steering angle acceleration increases.

14. The method of claim 12, wherein the magnitude of the column torque and a magnitude of the variable count have a quadratic functional proportion relationship.

15. The method of claim 11, wherein the step of calculating the compensation output comprises the steps of:
calculating, by the MDPS controller, the blending period for compensating for the autonomous driving command and the driver command based on the column torque when the MDPS controller determines that the driver has intervened in steering;
calculating, by the MDPS controller, the final weight for compensating for the autonomous driving command and the driver command according to the column torque and the steering angular velocity; and
calculating, by the MDPS controller, the compensation output by compensating for the autonomous driving command and the driver command by applying the final weight according to the calculated blending period.

16. The method of claim 15, wherein the step of calculating the final weight comprises the step of acquiring, by the MDPS controller, a first weight corresponding to the column torque from a column torque weight table in which a weight is matched with each column torque, acquiring a second weight corresponding to the steering angular velocity from a steering angular velocity weight table in which a weight is matched with each steering angular velocity, and calculating the final weight by multiplying the first and second weights.

17. The method of claim 16, wherein the step of calculating the compensation output comprises the step of calculating, by the MDPS controller, the compensation output through an expression of [(1−final weight)*autonomous driving command+final weight*driver command] by increasing the final weight from 0 to 1 according to the blending period.

18. The method of claim 11, further comprising the step of receiving, by the steering angle position controller, error values of the command steering angle and a motor steering angle and filtering the received error values, through a variable high-pass filter that varies a cutoff frequency according to a command steering angular velocity, and then adjusting a position control gain and outputting the autonomous driving command to the MDPS controller.

19. The method of claim 18, wherein when varying the cutoff frequency, the MDPS controller decreases the cutoff frequency when the command steering angular velocity is high, and increases the cutoff frequency when the command steering angular velocity is low.

\* \* \* \* \*